United States Patent [19]

Ängquist

[11] 4,247,888

[45] Jan. 27, 1981

[54] STATIC CONVERTOR APPARATUS

[75] Inventor: Lennart Ängquist, Enköping, Sweden

[73] Assignee: ASEA Aktiebolag, Vesteras, Sweden

[21] Appl. No.: 54,053

[22] Filed: Jul. 2, 1979

[30] Foreign Application Priority Data

Jul. 3, 1978 [SE] Sweden ............... 7807466

[51] Int. Cl.³ .................................. H02M 1/14
[52] U.S. Cl. ..................... 363/47; 363/36; 363/37; 363/128
[58] Field of Search ............... 363/34, 35, 36, 37, 363/38, 39, 44–48, 128, 129

[56] References Cited

U.S. PATENT DOCUMENTS

| | | | |
|---|---|---|---|
| 3,939,387 | 2/1976 | Maeda | 363/34 X |
| 3,987,356 | 10/1976 | Steigerwald | 363/44 |
| 4,139,885 | 2/1979 | Overzet et al. | 363/37 X |

FOREIGN PATENT DOCUMENTS 470799  8/1975  U.S.S.R. ............... 363/129

*Primary Examiner*—William M. Shoop
*Attorney, Agent, or Firm*—Pollock, Vande Sande & Priddy

[57] ABSTRACT

A static convertor with forced commutation is connected between an alternating voltage network and a direct voltage network. A filter is connected in parallel with a smoothing capacitor on the DC side of the convertor. The filter consists of the series-connection of an inductor, a filter capacitor and two controllable semiconductor valves that are connected in parallel in opposed relation. The natural frequency of the filter is higher than the product of the frequency of the alternating voltage network and the pulse number of the converter. The valves are made to carry current in time with the fundamental tone of the AC component present in the direct current of the convertor. In this way, the variations of the direct voltage of the convertor, caused by the AC direct current component, may be practically eliminated.

4 Claims, 2 Drawing Figures

STATIC CONVERTOR APPARATUS

BACKGROUND OF THE INVENTION

The present invention relates to static convertor equipment for transmitting energy between an AC network and a DC network, and, more particularly, to such equipment including a convertor with forced commutation that is connected to an AC network through an inductance element, and to a DC network having a smoothing capacitor and a filter connected in parallel with the capacitor, the filter having an inductor that is connected in series with a filter capacitor.

Static convertor apparatus for transmitting energy between an AC and a DC network is known to the art, for example such apparatus is disclosed in the published German patent application No. 2,217,023. For such apparatus, the filter circuits connected on the DC side of the convertor may be assumed to maintain the direct voltage substantially constant. The alternating voltage generated by the convertor may then be controlled, for example by pulse width modulation of the convertor, so that the voltage becomes approximately sinusoidal and has the same frequency as the frequency of the AC network. By controlling the amplitude and the phase position of the alternating voltage of the convertor, the amplitude and the phase position of the alternating current flowing between the AC network and the convertor may be controlled and, thus, the magnitude and direction of the active and reactive power flowing between the AC network and the convertor equipment may be individually and arbitrarily controlled. In this way, complete control is obtained of the power that is transmitted between the AC and the DC networks, regardless of the direction of the power flux. At the same time the equipment may be controlled so that its reactive power consumption is maintained at a desired value, for example zero.

The inductance element that is connected between the convertor and the AC network and that takes up instantaneous voltage differences between the DC and AC voltages of the convertor may consist of a separate inductor or of the inductance of a transformer that is used for connecting the convertor to the AC network.

Equipment of the kind described above may, for example, be used to supply an AC motor with a variable frequency from an AC network with a constant frequency. The DC network then consists of an inverter connected to the DC side of the convertor.

A smoothing capacitor connected on the DC side of the convertor limits variations in the direct voltage. The direct current of the convertor will contain an AC component with a fundamental tone that has a frequency equal to the frequency of the AC network, multiplied by the pulse number of the convertor. If the convertor is a single-phase convertor (low pulse number) and the frequency of the AC network is low, the fundamental tone of the AC direct current component will have an amplitude that is of the same order of magnitude as the mean value of the direct current and it will have a low frequency.

In order to keep the variations in the direct voltage within reasonable limits an unrealistically high capacitance for the smoothing capacitor is often required or, at least, the required high capacitance seriously limits the maximum convertor power that may be installed, for reasons of space and weight.

From the above-mentioned German application No. 2,217,023 it is known to tune an LC filter to twice the power frequency and to connect the filter in parallel with a smoothing capacitor. In this way, the required capacitance of the smoothing capacitor is reduced, since the filter can be operated to completely eliminate the voltage variations that are due to the fundamental tone component of the AC direct current component of the convertor. The smoothing capacitor then only needs to damp the current harmonics of a higher order. However, for such prior art circuits, the necessary smoothing components (the smoothing capacitor and the filter) become undesirably large and heavy, particularly in situations where the equipment must be built into a vehicle. Thus, the rated power of the filter components only, at the frequency of the fundamental tone, will be of the same order of magnitude as the maximum active power for which the convertor is dimensioned.

Furthermore, for prior art filters there is the added risk that variations in operating temperature may change the tuning of the filter so that the filtering becomes less efficient. Accordingly, it is a primary object of the invention to provide a static convertor apparatus that transmits energy between an AC and a DC network and that employs filter components of reduced size.

A further object of the invention is to provide such an apparatus that will not be affected in operation by variations in the impedance values of filter components due to such factors as temperature or aging.

These and other objects of this invention will become apparent from a review of the detailed specification which follows and a consideration of the accompanying drawings.

BRIEF SUMMARY OF THE INVENTION

In order to achieve the objects of the invention and to overcome the problems of the prior art, the improved convertor apparatus, in accordance with the invention, includes a static convertor with forced commutation that has a characteristic pulse number. The convertor is connected on its AC side to a power-supplying alternating voltage network through an inductance element and on its DC side to a smoothing capacitor that is connected in parallel with a filter.

The filter includes a series-connected capacitor and inductor and the filter has a natural frequency that is higher than the product of the frequency of the alternating voltage network and the pulse number of the convertor. The filter is connected in series with two thyristors that are connected together in parallel in opposed relation.

A control circuit is connected to the thyristors and the circuit operates to alternately turn on the thyristors synchronously with the fundamental tone of the AC component of the direct current of the convertor.

DETAILED DESCRIPTION OF PREFERRED EMBODIMENTS

Figure 1:
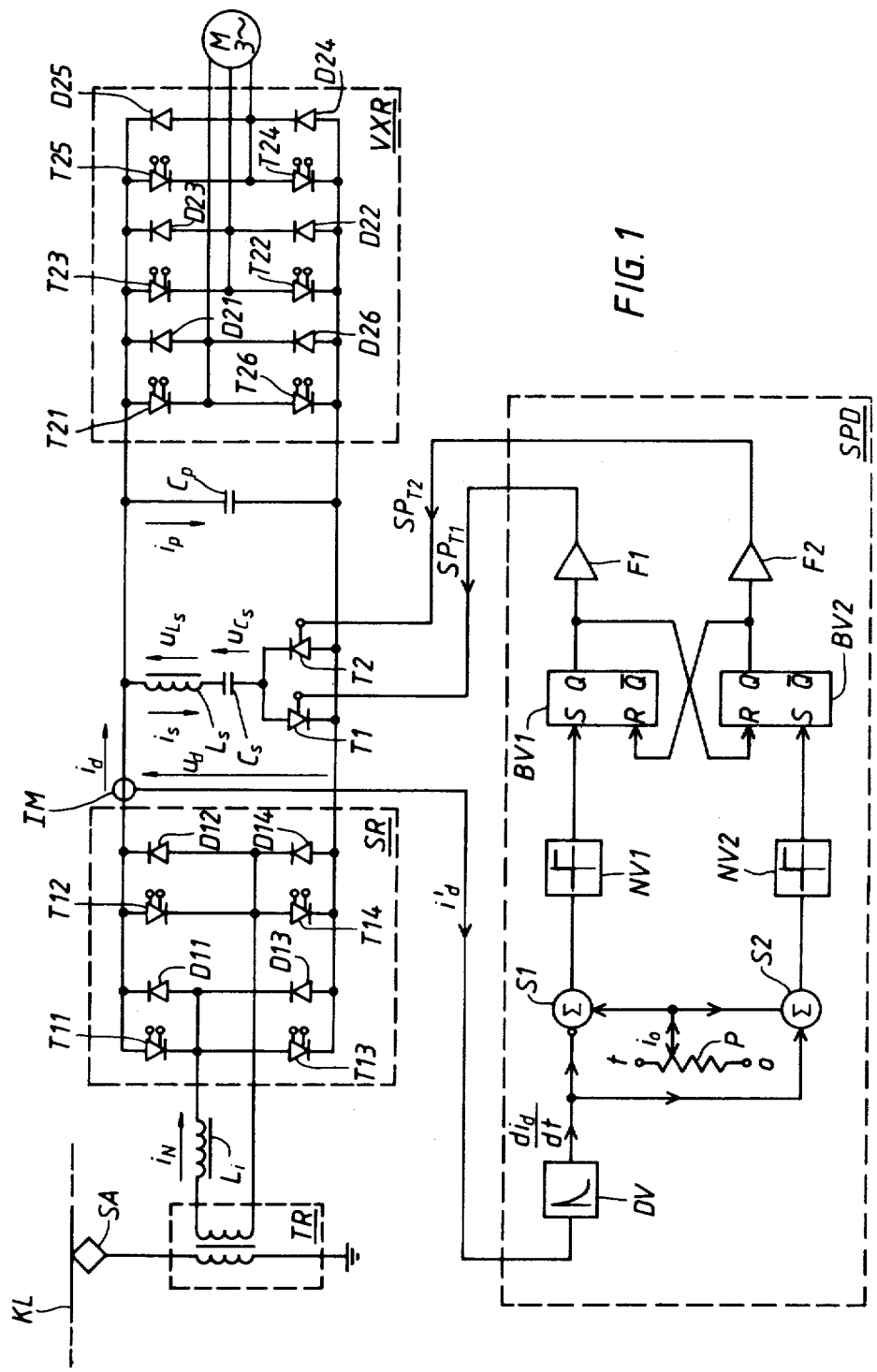
FIG. 1 illustrates a circuit diagram of a preferred embodiment of the improved convertor apparatus of the invention.

The remaining portion of this specification will describe preferred embodiments of the invention when read in conjunction with the attached drawings, in which like reference characters identify identical apparatus.

FIG. 1 shows a single-phase convertor SR that comprises four thyristors T11–T14 that may be turned on and off in a manner known to the art. Each thyristor is connected in parallel in an opposing relation to an associated diode D11–D14. The convertor SR is connected to an AC network that includes a transformer TR that is connected to a contact line KL through a current collector SA. The contact line KL carries AC voltage having a frequency that is assumed to be 16⅔ Hz for purposes of explaining the operation of the invention.

The convertor is connected to the AC network through an inductance element $L_i$ that may be either a separate inductor or the leakage inductance of the transformer TR, for example a leakage flux transformer. The DC terminals of the convertor are connected to a DC network that, in this case, is an intermediate link between the convertor SR and an inverter VXR. However, in general, the DC network may be any network or load object.

The inverter VXR is a self-commutated, three-phase inverter having a controllable frequency for controlling the speed of an asynchronous motor M. The inverter includes thyristors T21–T26 which can be turned off in a manner known to the art and associated diodes D21–D26 that are connected in parallel and in opposed relation to their respective thyristors. The inverter is known to the art and may be controlled in a known manner to provide a desired value of frequency and/or amplitude of alternating voltage to the motor M.

The convertor may be controlled by pulse width modulation, for example in the manner described in the above-mentioned German application No. 2,217,023, so that it generates an alternating voltage with a fundamental tone having the same frequency as the main frequency and having a moderate harmonic content. By controlling the amplitude and phase position of the alternating voltage output of the convertor relative to the main voltage, it is possible to individually control the magnitude and direction of the active and the reactive components of the alternating current that flows between the network and the convertor.

The active current component is controlled by influencing the phase position of the convertor voltage so that the mean value of the DC link voltage $u_d$ is maintained constant at a predetermined value that is higher than the peak value of the alternating voltage from the transformer TR. The reactive current component is controlled by influencing the amplitude of the convertor voltage so that the reactive current component of the current taken from the contact line becomes zero.

Since the current flowing between the network and the convertor is approximately sinusoidal, the direct current $i_d$ of the convertor contains a strong AC component. The AC component has a fundamental tone with a frequency that is the power frequency multiplied by the pulse number of the convertor. A single-phase convertor of the type described has a pulse number 2. Therefore, at the power frequency 16⅔ Hz the frequency of the fundamental tone is 33⅓ Hz.

In order to maintain the variations in the DC link voltage $u_d$ within reasonable limits despite the large AC component in the direct current of the convertor, a smoothing capacitor $C_p$ and a filter are connected on the direct voltage side of the convertor. The filter includes an inductor $L_s$ that is connected in series with a capacitor $C_s$ and with two thyristors T1 and T2 that are connected in parallel in opposing relation.

A control pulse device SPD is connected to control inputs of the thyristors T1 and T2. In operation, a current measurement device IM delivers a measurement signal $i'_d$ that is proportional to the instantaneous value of the direct current $i_d$ of the convertor SR. The measurement signal is differentiated in a differentiating circuit DV and the output signal $di_d/dt$ from the differentiating circuit is supplied to the summation devices S1 (with inverted sign) and S2. A constant comparison quantity $i_o$ is supplied to the summation devices, the quantity being obtained from a potentiometer P. The output signals from the summation devices are supplied to level flip-flops NV1 and NV2. Each of the flip-flops emits a logical one voltage signal when the input signal to the flip-flop is positive.

The output signals of the flip-flops are supplied to the set inputs S (dynamic inputs) of two bistable circuits BV1 and BV2. When the output signal of a level flip-flop is changed from "zero" to "one", the corresponding bistable circuit is set to one, that is its output signal Q becomes a logic "one". The output signals Q and dynamic reset inputs R of the circuits BV1 and BV2 are cross-connected. Thus, when one of the output signals Q of the bistable circuits switches from "zero" to "one", the output Q of the opposite bistable circuit is set to "zero". The output signals Q of the bistable circuits BV1 and BV2 are amplified by drivers F1 and F2 and are applied to the thyristors T1 and T2 in the form of control signals $SP_{T1}$ and $SP_{T2}$.

Figure 2:
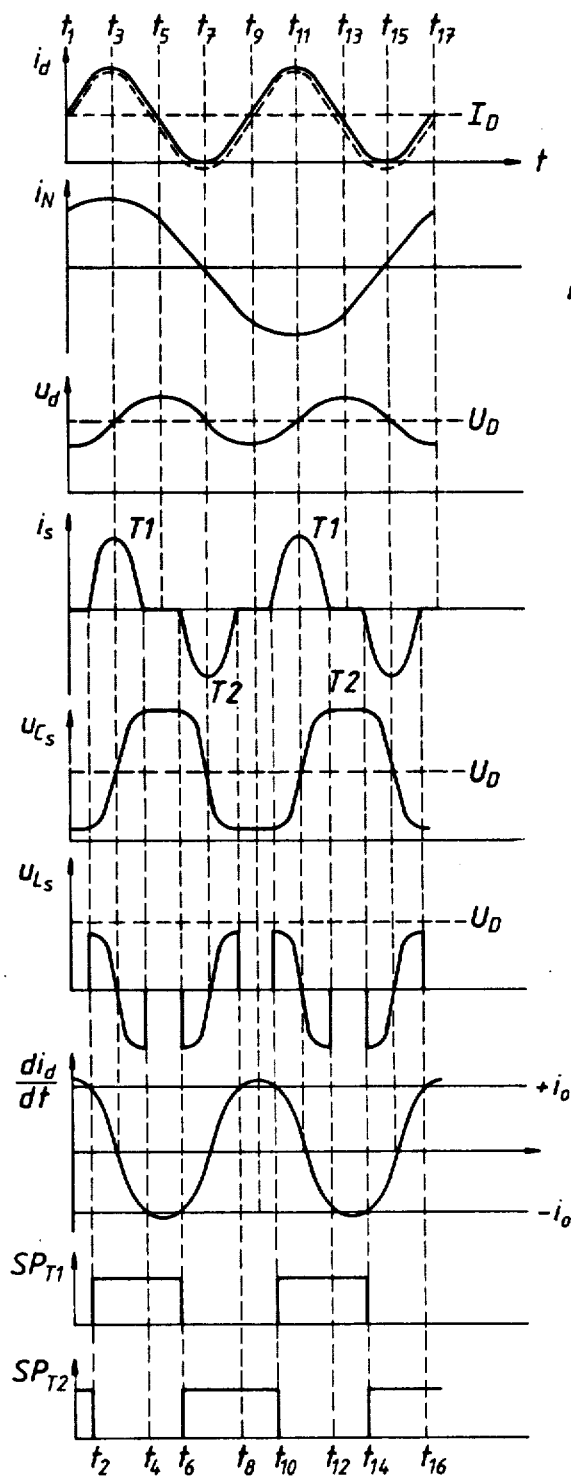
FIG. 2 shows plots of the operational signals for the apparatus of FIG. 1.

The operation of the equipment shown in FIG. 1 will now be described with reference to FIG. 2. As shown in FIG. 2, the alternating current $i_N$ that is applied to the convertor SR from the AC network is assumed to be sinusoidal, which (apart from high frequency harmonics) is a good approximation of what applies in practice. Also, the direct current $i_d$ at the output of the convertor SR contains an Ac component, the fundamental tone of which has a frequency that is twice that of the power frequency, since in this case the convertor SR has the pulse number 2. If the convertor is controlled so that $i_N$ is in phase with the voltage on the network side of the convertor, $i_d$ assumes the shape shown by the continuous line, and the amplitude of the fundamental tone of the AC component becomes equal to the mean value $I_D$ of $i_d$ (dashed horizontal line). If there is a phase difference between the alternating voltage and current of the convertor, and if the amplitude of the AC component of $i_d$ is unchanged, then the mean value of $I_D$ is lowered; that is, the curve $i_d$ is moved downwards for example, to the dash-lined sine curve, when the phase difference increases.

FIG. 2 shows the direct voltage $u_d$ on the direct voltage side of the convertor. The curve for the voltage $u_d$ is shown for the hypothetical case wherein the filter $L_s$-$C_s$ is inactive. Thus, the AC component of the voltage is limited only by a capacitor $C_p$ having a moderate capacitance. It should be understood that $u_d$ has a direct voltage component $U_D$ and an alternating voltage component with a frequency that is twice the power frequency and with a relatively high amplitude.

The third curve from the bottom of FIG. 2 shows the signal $di_d/dt$ that is obtained from the differentiating circuit DV. The $di_d/dt$ signal is a sine curve that leads the AC component of $i_d$ in phase by 90° and that is compared in the summation circuits S1 and S2 with the signals $+i_o$ and $-i_o$.

At $t_2$ the output signal from NV1 becomes "one" and the flip-flop BV1 is set to one, thereby applying a control signal $SP_{T1}$ to the thyristor T1 that causes T1 to ignite. Of course, at the same time the flop-flop BV2 is set to zero and the control signal $SP_{T2}$ to the thyristor T2 terminates. The filter circuit $L_s$-$C_s$ then performs half a cycle of an oscillation and thereafter the thyristor T1 is extinguished. The filter current $i_s$ and the capacitor and inductor voltages $u_{Cs}$ and $U_{Ls}$ are shown in FIG. 2 for this oscillation, which takes place during the time interval $t_2$-$t_4$. In the shown case, where the power frequency is 16⅔ Hz and the frequency of the AC component (the fundamental tone) of the direct current $i_d$ is 33⅓ Hz, the filter $C_s$-$L_s$ may be tuned, for example, to 50 Hz. The magnitude of the signal $i_o$ is chosen so that the thyristor T1 is ignited ¼ cycle (of the natural frequency of the filter) before the time $t_3$ at which the current $i_d$ has its maximum value. Therefore, the positive half cycle of the filter current $i_s$ is symmetrical around the time $t_3$.

At the time $t_6$ the output signal from S2 becomes positive, NV2 becomes one, the flip-flop BV2 is set to one and the flip-flop BV1 is set to zero. A control signal $SP_{T2}$ is then passed to the thyristor T2, which is ignited. The filter then oscillates for half a cycle of its natural frequency, and, thereafter, returns to its original position. The negative half cycle of the filter current $i_s$ (between $t_6$ and $t_8$) is symmetrical around the time $t_7$ at which $i_d$ has its minimum value.

At the time $t_{10}$, T1 is again ignited, thereby starting a new operational cycle by providing a new positive half cycle of the filter current $i_s$. Of course, the above-described operations are repeated in a cyclic fashion. Thus, it should be understood that the fundamental tone of the filter current $i_s$ will lie in phase with the current $i_d$.

If only the fundamental tones (with the frequency 33⅓ Hz) of the AC components of $i_d$, $i_s$ and $u_d$ are considered, the amplitude of $u_d$ is proportional to the difference between $i_d$ and $i_s$. When the filter circuit $L_s$-$C_s$ starts working, $i_s$ grows from zero and the amplitude of $u_d$ decreases from the value shown in FIG. 2 as $i_s$ grows. On the other hand, it is the AC component of $u_d$ that maintains the oscillation of the filter circuit. Thus, $i_s$ will automatically increase to a value close to zero. The resulting amplitude of the fundamental tone (33⅓ Hz) in the AC component assumes a value in a stationary condition that is just capable of maintaining the oscillation in the filter circuit. If the losses of the filter circuit are low (such losses may be achieved in a practice in a simple manner), the amplitude of the fundamental tone is very low and the $u_d$ component with the frequency of 33⅓ Hz is practically completed eliminated.

In practice, it may be suitable to delay the ignition of the thyristors T1 and T2 somewhat in relation to the times $t_2$, $t_6$, $t_{10}$, etc., shown in FIG. 2 in order to obtain a safe supply of energy to the oscillating circuit, for example when the equipment is started.

The filter for apparatus according to the invention should have a natural frequency that is greater than the pulse number times the power frequency. In the above-described example, the natural frequency of the filter was 50 Hz and the pulse number (2) times the power frequency (16⅔ Hz) was 33⅓ Hz. In prior art apparatus, for example as described in the German application No. 2,217,023, a filter is tuned to twice the power frequency, or 33⅓ Hz for the present example.

Because of the higher natural frequency for apparatus according to the invention, the inductance of the inductor $L_s$, where the size of the capacitor $C_s$ is unchanged, is only $$\left(\frac{33\frac{1}{3}}{50}\right)^2 = \frac{4}{9}$$

of the inductance of the inductor for prior art apparatus. Thus, for the invention, the size of the inductor $L_s$ is at least halved, thereby resulting in a considerable reduction in the total weight and space required for filter components, which constitute a considerable portion of the total apparatus. It should be appreciated that the weight and space saving for apparatus operating in accordance with the invention is particularly significant where the apparatus is used on a vehicle.

According to a preferred embodiment of the invention, thyristors T1 and T2 are ignited at intervals (e.g. $t_2$-$t_6$, $t_6$-$t_{10}$), the lengths of which are half the time of a cycle (1/33⅓ seconds) of the fundamental tone of the AC component of the direct current of the convertor. Thus, the second tone is completely eliminated from the filter current. Therefore, the filter current $i_s$ only has tones of the third and higher orders, which may be filtered off in a simple manner.

The capacitor $C_p$ in FIG. 1 is dimensioned so as to reduce the variations in the direct voltage $u_d$ to the desired level. The variations are produced by resultant harmonic currents from the convertor SR, the load VXR, and the filter $L_s$-$C_s$.

FIG. 1 shows how the load current of the convertor SR for controlling the thyristors T1 and T2 is sensed on the DC side of the convertor. Alternatively, this sensing may be performed on the AC side of the convertor.

In the foregoing, the invention was described with respect to a single phase convertor having a pulse number of two and connected to a single-phase network. However, the invention may alternatively be applied with apparatus in which the convertor is a three-phase convertor, for example with a pulse number 6 and is connected to a three-phase network.

Although the invention has been described above in connection with apparatus intended for vehicle operation, in which the DC network is an inverter apparatus according to the invention may also be employed in other fields as well. For such other applications, the DC network may consist of an arbitrary network or an object either supplied with or generating direct current.

In the above-described apparatus, the power flows substantially from the AC network to the DC network, although the power may temporarily flow in the opposite direction, for example in connection with regenerative braking. However, the invention may be applied with apparatus in which the power flows either wholly or substantially from the DC side to the AC side of the convertor.

In the apparatus described above, a single-phase AC network with the frequency 16⅔ Hz has been selected as an example. However, the invention may also be applied with apparatus which is operated with either lower or higher frequencies.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

The convertors SR and VXR of FIG. 1 may be formed by phase groups of the kind disclosed in the General Electric SCR Manual, 5th Edition, 1972, page 384, FIG. 13.25. The convertor SR may thus be according to FIG. 13.28 of this reference, where the terminals designated "Load" are connected to the AC network (transformer TR) and the DC terminals are connected to the DC intermediate link.

The inverter VXR may be built up from three phase groups, each according to the above-mentioned FIG. 13.25.

The current sensing means IM of FIG. 1 may be, for instance, a simple current measuring shunt, that is, a small resistor traversed by the current to be measured. The voltage across the resistor will be proportional to the instantaneous value of the current.

What is claimed is:

1. Improved convertor apparatus of a type wherein energy is transmitted between an alternating voltage network and a direct voltage network by means of a convertor with forced commutation and having a characteristic pulse number, the convertor being connected on an AC side to the alternating voltage network through an inductance element and the convertor being connected on a DC side to a smoothing capacitor and a filter connected in parallel with the smoothing capacitor, the filter having an inductor connected in series with a filter capacitor, the improved convertor apparatus comprising:

means for defining a natural frequency for said filter that is higher than the product of the frequency of the alternating voltage network and the pulse number of the convertor;
   at least two controllable semiconductor valves connected together in parallel in opposing relation and connected in series to said filter; and
   control means connected to said at least two controllable semiconductor valves for alternately making the semiconductor valves current-carrying synchronously with the fundamental tone of an AC component in a direct output current of said convertor.

2. The improved convertor apparatus of claim 1 wherein said control means includes means for controlling said at least two semiconductor valves to define a fundamental tone for current flowing in said filter that is in phase with the fundamental tone of the AC component of the direct output current of the convertor.

3. The improved convertor apparatus of claim 1 wherein said control means includes means responsive to the direct output current of the convertor for igniting said at least two semiconductor valves at times which lie one-fourth of a cycle of the natural frequency of said filter before the times for the extreme values of the fundamental tone of the AC component of the direct current of the convertor.

4. The improved convertor apparatus of claim 1 wherein said control means includes means for alternately igniting said at least two semiconductor valves at intervals which are half a cycle of the fundamental tone of the AC component of the direct current of the convertor.

* * * * *